United States Patent
Yue

(10) Patent No.: US 6,719,451 B1
(45) Date of Patent: Apr. 13, 2004

(54) ROTATING CUP MECHANISM

(75) Inventor: Shung-Hsiung Yue, Banchiau (TW)

(73) Assignee: Sara Rose International, Taipei Hsien (TW)

( * ) Notice: Subject to any disclaimer, the term of this patent is extended or adjusted under 35 U.S.C. 154(b) by 0 days.

(21) Appl. No.: 10/409,473

(22) Filed: Apr. 9, 2003

(51) Int. Cl.[7] .................................................. B01F 9/08
(52) U.S. Cl. ........................................ 366/130; 366/220
(58) Field of Search .................................. 366/130, 220, 366/225, 221, 228, 229, 237, 129

(56) References Cited

U.S. PATENT DOCUMENTS

| 10,038 | A | * | 9/1853 | Dexter | 366/345 |
| 455,189 | A | * | 6/1891 | Farrar | 366/237 |
| 746,629 | A | * | 12/1903 | Geer | 366/228 |
| 2,516,655 | A | * | 7/1950 | Smith | 366/237 |
| 3,156,636 | A | * | 11/1964 | Desbois | 366/235 |
| 5,934,800 | A | * | 8/1999 | Bonacci | 366/213 |

* cited by examiner

Primary Examiner—Tony G. Soohoo

(57) ABSTRACT

Aiming to eliminate the need to use an external stir in most hot beverage cups, the present invention of a rotating cup mechanism includes: an outer cup, an inner cup and an outer cup base driving module while the inner cup is normally inset in the outer cup and interlocked with the driving module where the driving module leads to a push button exposed on the side. When the push button is repeatedly pressed, the driving module moves its gear wheel to start relative rotating motion between the outer and inner cups, generating liquid flows in the cup to achieve a more equilibrium mix of the liquid content.

A secondary purpose of the present invention is the provision of a detachable inner cup that is can be easily removed for cleaning and then reassembled.

3 Claims, 4 Drawing Sheets

ROTATING CUP MECHANISM

BACKGROUND OF THE INVENTION

1) Field of the Invention

The invention relates to a rotating cup mechanism where an inner/outer cup combination devises the inner cup to rotate, inducing a liquid flow inside the cup to achieve the stirring effect in the cup.

2) Description of the Prior Art

A conventional cup needs a stir to mix the beverage it holds, the stir needs to be remove from the cup when the stirring motion is completed in order to allow the user to sip from the cup, yet the used stir causes a stain on the tabletop unless a napkin or a saucer is provided. Sipping hot beverage may take some time, the beverage tend to have its fine sediments settled in the duration; it calls for the repeated uses of a stir, causing further inconveniences.

When people use tea bag in a cup, long simmering tea bags cause bitter taste, how to place lightly used tea bags aside is also a frequent little task for tea drinkers.

Most coffee and tea drinkers are burdened permanently with the use of stirs, a seemingly insignificant but perpetual extra effort.

SUMMARY OF THE INVENTION

The present invention is thus aimed primarily to provide a rotating cup mechanism comprises: an outer cup, an inner cup and an outer cup base driving module where the inner cup is inset in the outer cup and interlocked with a driving module while the driving module leads to a push button exposed on the side. When the push button is repeatedly pressed, the driving module moves gear wheel to start relative rotating motion between the outer and inner cups, thereby generating liquid flows in the cup to achieve a better mix of the liquid content.

A secondary purpose of the present invention is the provision of a detachable inner cup that can be easily removed for cleaning and then reassembled Another goal of the present invention is one of artistic inspiration and visual effect: to manufacture the outer cup entirely of transparent material while the outer face of the inner cup is to be faced with printing graphic materiel or text. Interesting graphic and visual effects appear when the cup is in rotation.

BRIEF DESCRIPTION OF THE DRAWINGS

To enable a further understanding of the said objectives and the technological methods of the invention herein, the brief description of the drawings below is followed by the detailed description of the preferred embodiments.

DETAILED DESCRIPTION OF THE PREFERRED EMBODIMENT

Figure 1:
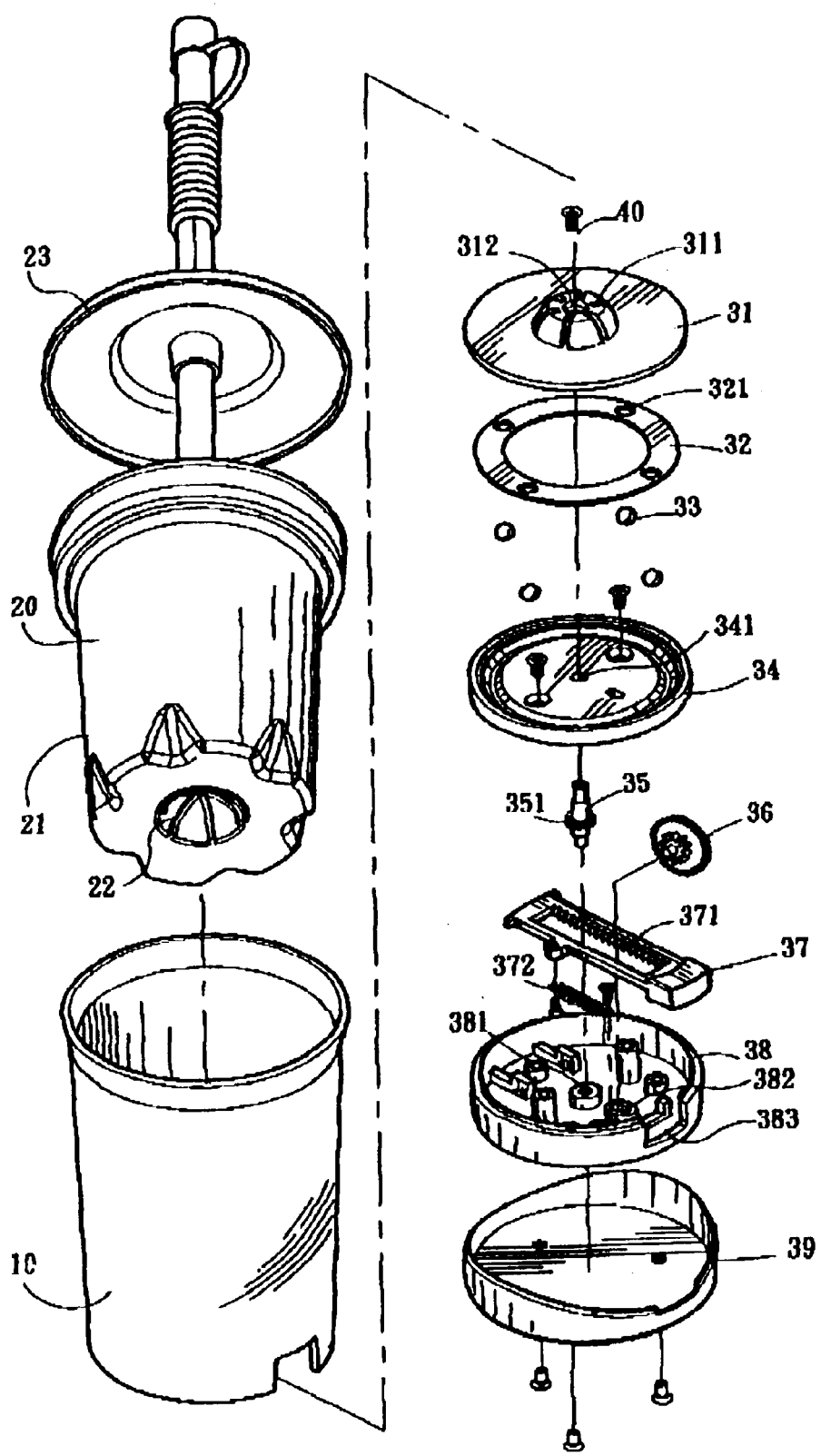
FIG. 1 is an enlarged, exploded view of the rotating cup mechanism according to the present invention.
Figure 3:
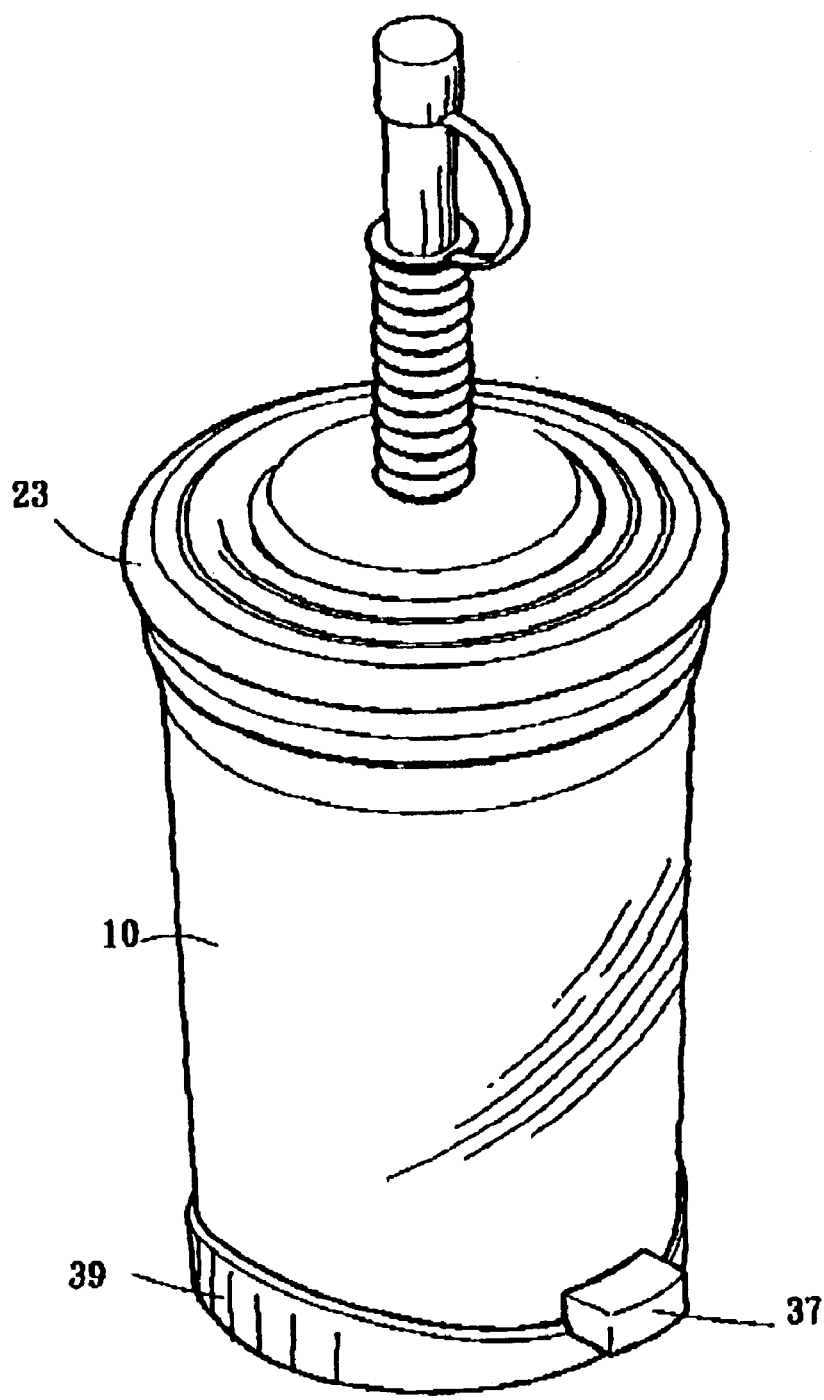
FIG. 3 is an exterior perspective view of the rotating cup mechanism according to the present invention.

Referring to FIGS. 1 and 3 of the present invention, comprises: an outer cup (10), an inner cup (20) and a base driving module (30) of the outer cup (10), wherein, the outer cup (10) is a vacant tube volume, ready for the inner cup (20) to set in, the inside wall surface of inner cup (20) is fitted with a plurality of protruding leaves (21). The inner cup (20) has a number of anchor petals (22) on the underside of the base whereas the top opening thereof is fitted with a cover (23), the driving module (30) is fixed onto the base of outer cup (10), included wherein are: upper seat (31), ball bearing ring (32), ball bearing (33), lower seat (34), driving axle (35), gear wheel (36), push button (37), base seat (38), and base cover (39). On top of the upper seat (31) are a plurality of petal traps (311) to interlock with the aforementioned anchor petal (22). The axle hole (312) on upper seat (31) is anchored onto the driving axle (35) by a screw (40). The ball bearing ring (32) is fitted with a ball bearing trap (321) to position the ball bearings (33), sandwiched in between the upper seat (31) and the lower seat (34), whereby constituting a ball bearing structure. The lower seat (34) and base seat (38) are also locked into one element by using the screw (40) wherein a vacant space between the two forming a housing for driving axle (35), gear wheel (36) and push button (37). Both the lower seat (34) and the base seat (38) are provided with the center holes (341) (381) and the rectangular positioning holes (342) (382) each to allow the driving axle (35) and gear wheel (36) to assemble. There is another slide trap (383) on the base seat (38) to allow the installation of the push button (37) and to guide the movement of the push button (37). The Push button (37) is to be exposed on the side of the base seat (38) in order to be easily pressed. The protruding gear (351) of driving axle (35) interlocks with the gear wheel (36) while the push button (37) leads to a gear strip (371) that also interlocks with the gear wheel (36). The push button (37) connects to the base seat (38) through an elastic spring (372) to maintain the elasticity for repositioning. The base cover (39) is to assemble with the base seat (38) in order to unite the driving module with outer cup (10).

Figure 4:
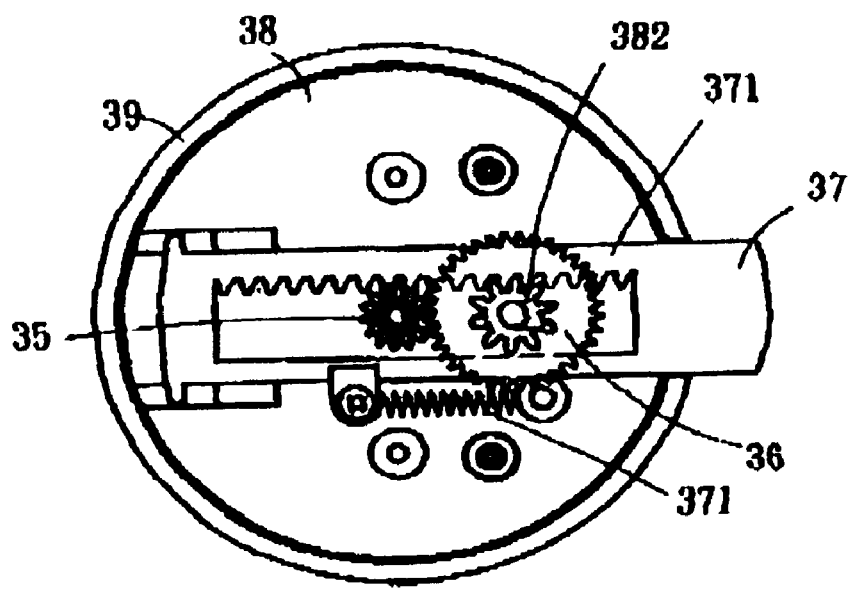
FIG. 4 is a plan-sectional view showing the driving module with gear wheel engaged onto the driving axle according to the present invention.
Figure 5:
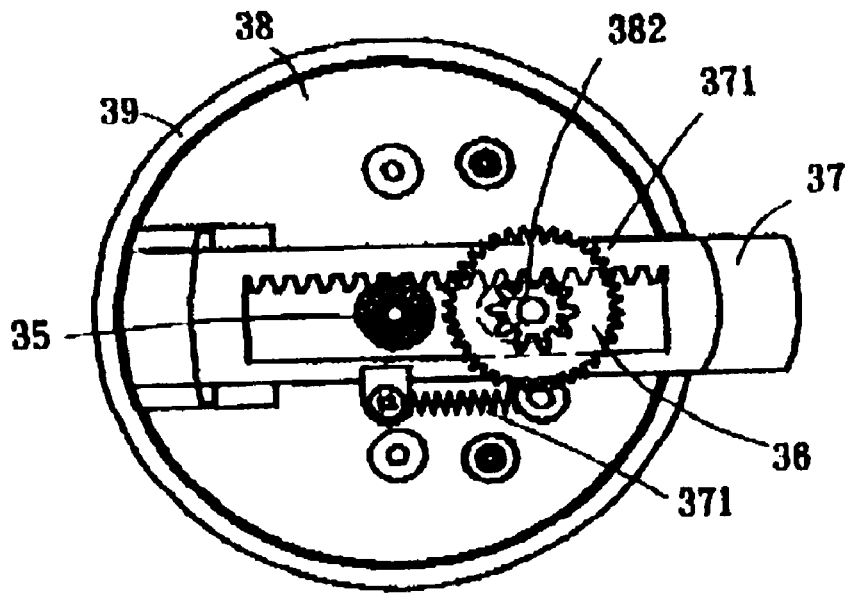
FIG. 5 is a plan-sectional view showing the driving module with gear wheel released from the driving axle according to the present invention.

Referring to FIGS. 4 and 5 wherein the gear wheel (36) is guided by a rectangular positioning hole, when push button (37) is pressed, gear wheel (36) interlocks with driving axle (35) and rotate. When the pressure on push button (37) is released, and returns push button (37) to its stable position via the elastic spring (372) force, meanwhile the gear strip (371) pulls back the gear wheel (36) from interlocking with the driving axle (35) during the process, so that driving axle (35) can continue its single directional rotation.

Figure 2:
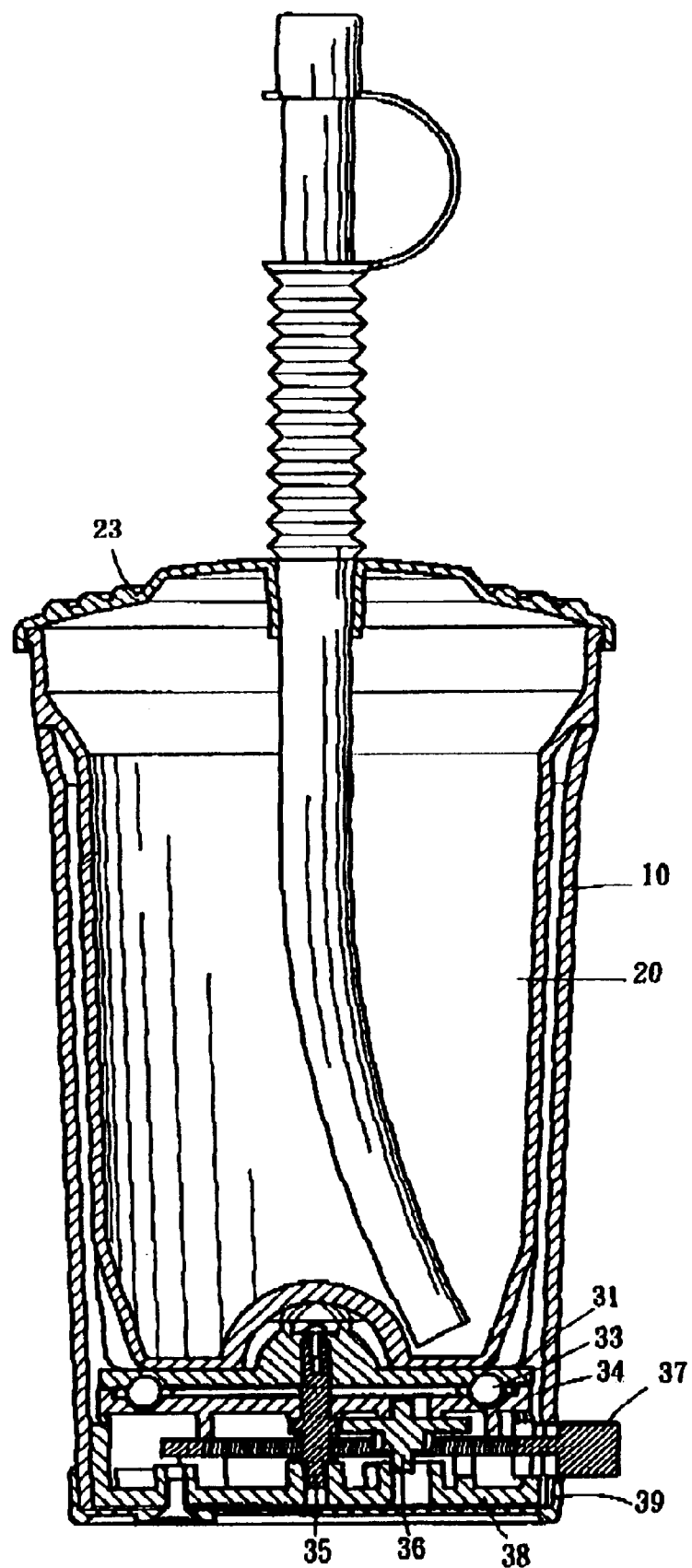
FIG. 2 is a cross-sectional view of the rotating cup mechanism according to the present invention.

Referring to FIG. 2 wherein the present invention, after assembling, has the outer cup (10) united with the driving module (30) as one element. When inner cup (20) is inset in outer cup (10), the anchor petal (22) interlocks with the petal trap (311) so that inner cup (20) rotates while upper seat (31) is driven into rotating motion.

While being used, inner cup (20) is filled with liquid while the push button (37) is repeatedly pressed. A force is exerted through gear wheel (36), driving axle (35), transferring onto the upper seat (31), driving the inner cup into rotation inside of outer cup (10) meanwhile the protruding leaves (21) on the base of inner cup (20) will stir the liquid content into a flowing motion, resulting the liquid turning into a more equilibrium mixture.

The present invention requires no external stirring tool; a user only needs to press the push button a few times for the inner cup (20) to stir the liquid content. As a result, all worries about dripping stain can be avoided. In addition the present invention allows the inner cup to be removed and cleaned separately; it is therefore an extremely convenient and practical household item.

Also worth mentioning of the present invention is that the outer cup can be made of entirely transparent material while the outside of the inner cup wall can be decorated with graphic pattern or text. Interesting visual effects take place when the inner cup is in rotation. While applying to the children's market, not only is the present invention an interesting household utility item but a highly educational one with all the interesting visual effects and the rotating mechanism made visible at the base of the outer cup.

It is of course to be understood that the embodiment described herein is merely illustrative of the principles of the invention and that a wide variety of the modifications thereto may be effected by persons skilled in the art without departing from the spirit and scope of the invention as set forth in the following claims.

What is claimed is:

1. A rotating cup mechanism comprises:

an outer cup, an inner cup and a driving module at the base of the outer cup wherein the inner cup is to be inset in the outer cup and to interlock with the driving module on the base of the outer cup, wherein, upper seat, ball bearing ring, ball bearings, lower seat, driving axle, gear wheel, push button and base seat, by pressing the push button repeatedly, the gear wheel moves the driving axle, and in turns, the upper seat and inner cup to generate a rotating motion relative to the outer cup.

2. The rotating cup mechanism of claim 1, wherein the inside wall surface of the inner cup is devised with a plurality of protruding leaves.

3. The rotating cup mechanism of claim 1, wherein the top opening of the inner cup is fitted with a cover.

* * * * *